(12) United States Patent
Mohacsi

(10) Patent No.: US 7,021,801 B2
(45) Date of Patent: Apr. 4, 2006

(54) HIGH-INTENSITY DIRECTIONAL LIGHT

(75) Inventor: Ferenc Mohacsi, Muskego, WI (US)

(73) Assignee: Everbrite, LLC, Greenfield, WI (US)

( * ) Notice: Subject to any disclaimer, the term of this patent is extended or adjusted under 35 U.S.C. 154(b) by 112 days.

(21) Appl. No.: 10/664,014

(22) Filed: Sep. 16, 2003

(65) Prior Publication Data

US 2004/0057234 A1 Mar. 25, 2004

Related U.S. Application Data

(60) Provisional application No. 60/412,036, filed on Sep. 19, 2002.

(51) Int. Cl.
*F21V 1/12* (2006.01)

(52) U.S. Cl. .................. 362/477; 362/545; 362/493

(58) Field of Classification Search ................ 362/477, 362/493, 510, 514, 517, 545, 547, 294, 373, 362/296, 297, 346, 349, 800, 301–303; 340/901, 340/908, 908.1, 815.45, 981, 468, 984, 985; 257/98–100

See application file for complete search history.

(56) References Cited

U.S. PATENT DOCUMENTS

| | | | | |
|---|---|---|---|---|
| 3,757,104 A * | 9/1973 | Cooper | .................. | 362/477 |
| 4,384,268 A | 5/1983 | Matthewman | | |
| 4,931,768 A * | 6/1990 | Jincks et al. | .................. | 340/473 |
| 5,285,359 A * | 2/1994 | Czipri | .................. | 362/477 |
| 5,404,869 A | 4/1995 | Parkyn, Jr. et al. | | |
| 5,440,197 A | 8/1995 | Gleckman | | |
| 5,557,493 A | 9/1996 | Ross | | |
| 5,577,492 A | 11/1996 | Parkyn, Jr. et al. | | |
| 5,585,783 A | 12/1996 | Hall | | |
| 5,613,769 A | 3/1997 | Parkyn, Jr. et al. | | |
| 5,655,832 A | 8/1997 | Pelka et al. | | |
| 5,667,972 A | 9/1997 | Drmanac et al. | | |
| 5,676,453 A | 10/1997 | Parkyn, Jr. et al. | | |
| 5,684,354 A | 11/1997 | Gleckman | | |
| 5,721,795 A | 2/1998 | Pelka | | |
| 5,757,557 A | 5/1998 | Medvedev et al. | | |
| 5,806,955 A | 9/1998 | Parkyn, Jr. et al. | | |
| 5,892,325 A | 4/1999 | Gleckman | | |
| 5,924,788 A | 7/1999 | Parkyn, Jr. | | |
| 5,926,320 A | 7/1999 | Parkyn, Jr. et al. | | |
| 5,929,788 A * | 7/1999 | Vukosic | .................. | 340/908.1 |
| 6,007,209 A | 12/1999 | Pelka | | |
| 6,043,591 A | 3/2000 | Gleckman | | |
| 6,086,218 A * | 7/2000 | Robertson | .................. | 362/157 |
| 6,086,220 A | 7/2000 | Lash et al. | | |
| 6,126,299 A | 10/2000 | Hypes et al. | | |

(Continued)

OTHER PUBLICATIONS

Lumileds Lighting, LLC, Technical Concept Data Luxeon Star/I (Side Emitting), 2001, pp. 1-7, Publication No. JP03 (Dec. 2001), San Jose, CA.

(Continued)

*Primary Examiner*—Stephen Husar
*Assistant Examiner*—Hargobind S. Sawhney
(74) *Attorney, Agent, or Firm*—Michael Best & Friedrich LLP

(57) ABSTRACT

A high-intensity light comprising a side-emitting optoelectronic device adapted to emit light of a desired color. A heat sink is positioned adjacent the optoelectronic device and a reflector at least partially surrounds the optoelectronic device. The reflector is spaced a distance from the optoelectronic device. A window portion is sized to output the light in a desired arc.

48 Claims, 4 Drawing Sheets

U.S. PATENT DOCUMENTS

| | | |
|---|---|---|
| 6,134,092 A | 10/2000 | Pelka et al. |
| 6,166,860 A | 12/2000 | Medvedev et al. |
| 6,177,761 B1 | 1/2001 | Pelka et al. |
| 6,181,476 B1 | 1/2001 | Medvedev et al. |
| 6,183,100 B1 * | 2/2001 | Suckow et al. ............... 362/35 |
| 6,543,911 B1 * | 4/2003 | Rizkin et al. ............... 362/307 |
| 6,598,998 B1 | 7/2003 | West et al. |
| 6,607,286 B1 | 8/2003 | West et al. |
| 6,626,557 B1 * | 9/2003 | Taylor ........................ 362/249 |
| 6,627,922 B1 * | 9/2003 | Ishinaga ...................... 257/99 |

OTHER PUBLICATIONS

Lumileds Lighting, LLC, Power Light Source Luxeon 1-Watt Star, 2002, pp. 1-13, Document #: DS23 (Jul. 2002), San Jose, CA.

* cited by examiner

HIGH-INTENSITY DIRECTIONAL LIGHT

This application claims the benefit of prior filed co-pending provisional patent application No. 60/412,036 filed on Sep. 19, 2002.

BACKGROUND OF THE INVENTION

The present invention relates to lights, and particularly to navigational lights. More particularly the present invention relates to navigational lights that use light emitting diodes as the light source.

High-intensity lights such as navigational lights are required on many types of vessels including boats, ships, and aircraft. In addition, high intensity lights are often used on buoys or other markers to aid boatman and pilots in navigation. To aid in navigation, the lights must be sufficiently bright to be seen from large distances. In addition, the lights sometimes differ in color to further aid in guiding vessels or indicating orientation of the particular craft to which the lights are attached. Furthermore, in some cases, the lights must conform to horizontal and vertical viewing angles as prescribed in various regulatory standards.

Previous high-intensity lights employed incandescent, fluorescent or other sources of light capable of high luminous intensity. Some of these light sources have relatively short lives and thus frequently failed in use or when needed, while others, such as fluorescent lights, require expensive power supplies.

In addition to short lives, some previous high-intensity light sources consumed large amounts of power to operate and generated significant heat. An engine or other source of power was needed to maintain the lights for significant periods of time.

Furthermore, some previous light sources required alternating current or high voltage to operate, thereby adding to the complexity of the electrical system.

SUMMARY OF THE PREFERRED EMBODIMENT

The present invention provides a high-intensity light comprising an optoelectronic device having a characteristic dimension and adapted to emit light of a desired color. The high-intensity light further comprises a base that supports the optoelectronic device and a reflector portion at least partially surrounding the optoelectronic device and spaced a distance from the optoelectronic device. The high-intensity light also includes an output window portion sized to emit light in a desired arc.

In preferred constructions, the high-intensity light includes a side emitting light emitting diode preferably surrounded by the combination of the reflector portion and the window portion. The reflector portion is spaced a distance from the diode that is approximately equal to five times the characteristic dimension. The reflector portion includes a plurality of facets, with each facet having a width at least as wide as the characteristic dimension.

In another aspect, the invention provides a light-emitting apparatus powered by a direct current, the apparatus comprising a substantially water-tight housing including a base, a reflector portion having a plurality of facets, and a window portion defining an arc. The apparatus further includes a side emitting light emitting diode supported within the housing and spaced a distance from the reflector portion. The LED emits light of a desired color when powered by the direct current. Each facet of the reflector portion preferably redirects a portion of the emitted light toward the window portion.

In yet another aspect, a light-emitting apparatus adapted to project high-intensity light in a desired arc comprises a side-emitting light source having a top, a bottom, and sides connecting the top and bottom. The light source is operable to emit light through the sides to produce a cylinder of light at a desired wavelength. The apparatus also includes a base supporting the light source and an output window portion partially surrounding the light source. The window portion extends through a window arc equal to the desired arc. A multi-faceted reflector reflects light toward the window portion. The reflector and the window together define a cylinder that surrounds the sides of the light source. The facets of the multi-faceted reflector are positioned to reflect the light through the window portion to produce a wedge-shaped directional beam of light.

BRIEF DESCRIPTION OF THE DRAWINGS

The detailed description particularly refers to the accompanying figures in which.

DETAILED DESCRIPTION OF THE DRAWINGS

Before describing the invention in detail, it should be noted that unless otherwise specified, the term light emitting diode (LED) as used herein includes a light emitting diode and a corresponding refractor or optic. The light emitting diode is an electrical device that produces light in response to an applied current and voltage. The optic receives the light generated by the diode portion of the LED and refracts, reflects, or otherwise directs the light such that it is emitted from the refractor in the desired pattern.

Furthermore, while the preferred constructions employ an LED as the light source, other optoelectronic (electronic devices that emit light when powered) light sources may be used and will function with the present invention. For example, light-emitting devices such as polymer or organic light emitting devices or electroluminescent devices could be used with the present invention. In addition, more conventional light sources will also function to provide a light source for the present invention.

It should also be noted that the term "intensity" as used herein is meant to describe the luminous intensity in candela per square meter ($cd/m^2$) produced by the light as measured across the visible arc through which the light is emitted.

Figure 1:
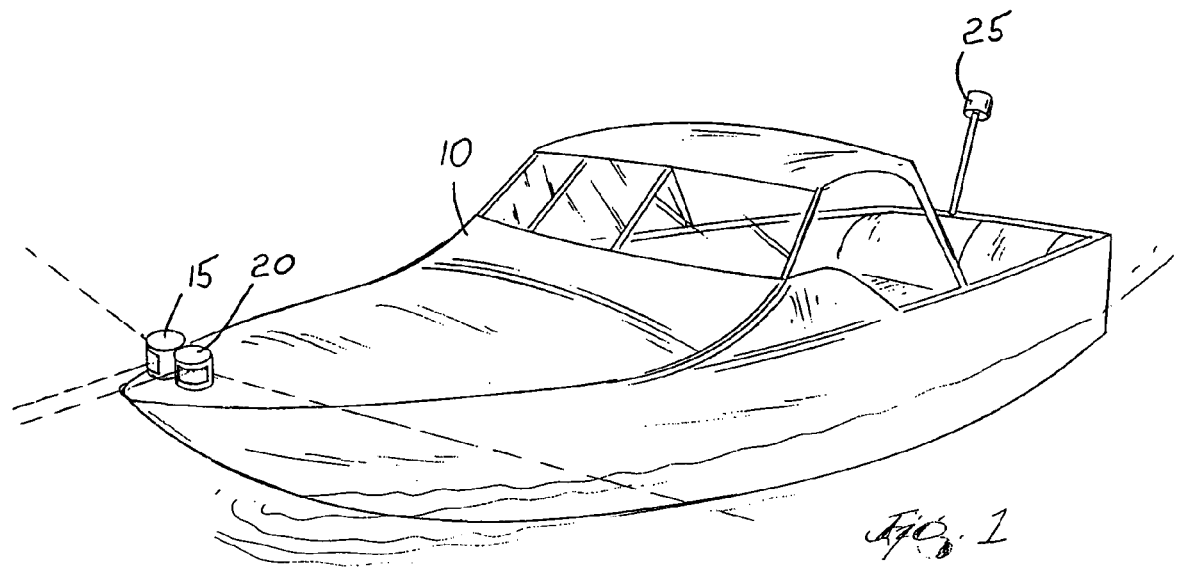
FIG. 1 is a perspective view of a vessel including navigation lights embodying the invention.

With reference to FIG. 1, a boat 10 including a pair of bow (front) lights 15, 20 and a stern (rear) light 25 is illustrated. These lights 15, 20, 25 increase the visibility of the vessel and aid the boatman in navigation when visibility is poor, such as at night. While navigation lights 15, 20, 25 for boats 10 are illustrated and described herein, it should be understood that the present invention is not to be limited to navigation lights for boats. Rather, lights embodying the present invention can be used in many other applications where a light beacon is desirable. For example, airplanes use similar navigation lights. The present invention is well suited to that application. Navigational buoys and tall structures (e.g., cell towers, transmission towers, water towers, etc.) also employ directional lights of high intensity. In yet another application, the lights of the present invention may serve as emergency vehicle lights. A person having ordinary skill in the art will realize that many applications that require high-intensity directional light, in addition to the ones described herein, are possible.

To function as navigation lights 15, 20, 25, or any directional light for that matter, the light must direct the beam of light in the proper direction. For example, in the navigation lights 15, 20, 25 of FIG. 1, United States Coast Guard regulations require that each bow light 15, 20 be visible throughout a 112.5° arc. For the stem light 25, regulations require that the light be visible through a 135° arc.

Figure 2:
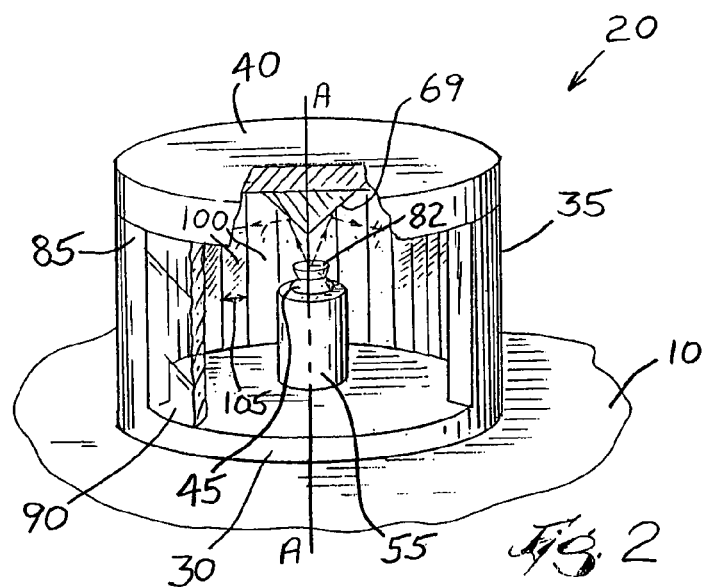
FIG. 2 is a perspective view of one of the navigation lights of FIG. 1 including an optoelectronic device.
Figure 5:
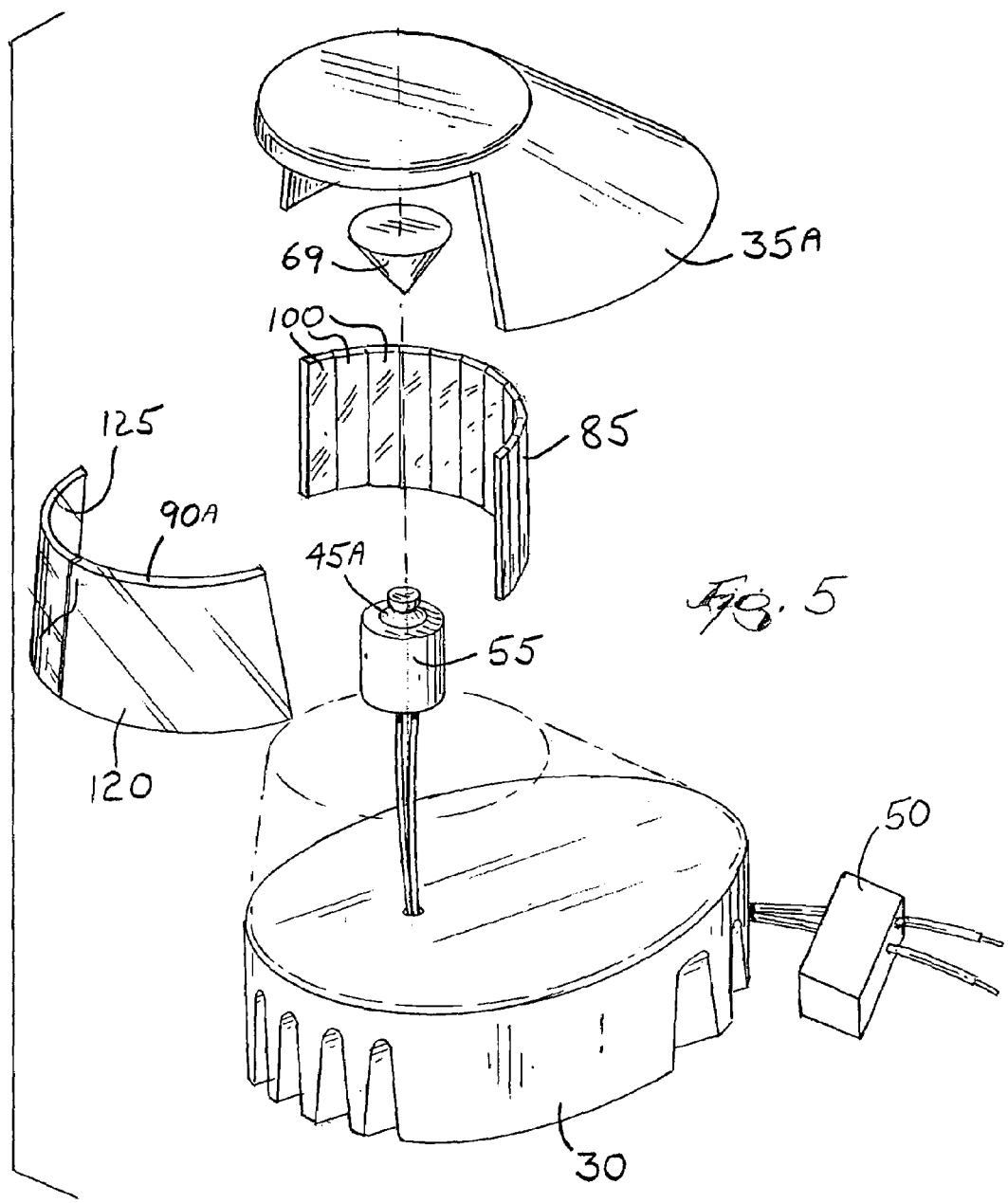
FIG. 5 is an exploded perspective view of another navigation light embodying the invention.

Turning to FIG. 2, a single bow navigation light 20 of FIG. 1 is shown in detail. The light 20 includes a base 30, a housing 35, a cover 40, and a light emitting diode 45 (LED). In some constructions, the base 30 provides support for a circuit board that includes the LED 45. In some of these constructions, the circuit board includes voltage and current controllers that can be adjusted to maintain the desired voltage and current flow to the LED 45. In other constructions, voltage and current control circuitry 50 is housed elsewhere in the circuit, such as is shown in FIG. 5.

The base 30 supports a heat sink 55 that dissipates the excess heat generated by the LED 45. The heat sink 55 is large enough to dissipate the excess heat and maintain the LED 45 at an optimum operating temperature. If the heat sink 55 does not dissipate sufficient heat, the life and the output of the LED 45 may be compromised. The heat sink 55 is generally metallic with aluminum being the preferred material. However, other materials that conduct heat are suitable choices for the heat sink 55 portion of the base 30. In some constructions, the heat sink 55 includes holes or irregular edges that increase the overall surface area of the heat sink 55, and thus the heat dissipation capacity. In still other constructions, fins or other protrusions project from the surface of the heat sink 55 to further improve the heat dissipation of the heat sink 55. Fans, heat pipes, or phase change materials may also be employed to remove excess heat from higher wattage LEDs 45.

Figure 4:
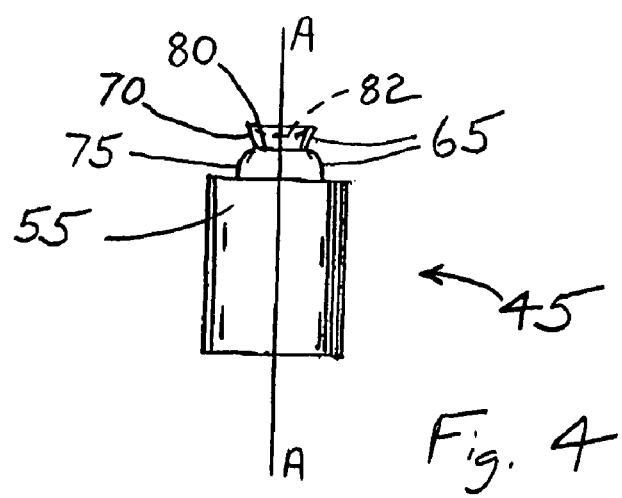
FIG. 4 is a front view of the optoelectronic device of FIG. 2.

The LED 45 resides near the center of the base 30 and produces a highly luminous beam of light when connected to the proper power supply. The shape of the LED 45, illustrated best in FIG. 4, is adapted to emit a beam of light in a radial direction out of the light emitting surfaces 65 that extend 360° around the central axis A—A of the diode 45. Little or no light escapes vertically out of the diode 45; instead, the light is emitted in a radial direction around the LED 45 and substantially perpendicular to the axis A—A. To utilize any light that may escape through the top of the LED 45, many constructions employ a second reflector 68. As illustrated in FIG. 2, a conical reflector 69 is well suited to the task of reflecting light emitted from the top of the LED 45 along paths that are substantially perpendicular to the central axis A—A. Other constructions may use other reflectors as the second reflector 68. For example, in another construction, the top of the LED 45 is painted or otherwise coated. The coating reflects the light in the desired direction while the light is still within the LED 45.

The LED 45 of FIG. 4 includes an upper frustoconical portion 70 and a lower domed portion 75. The frustoconical portion 70 includes a concave top surface 82 that reflects light traveling vertically within the LED 45 out the light emitting surfaces 65. A truncated substantially spherical portion defines the lower domed portion 75. A junction between the domed portion 75 and the frustoconical portion 70 defines a characteristic dimension 80 of the LED 45. In preferred constructions, this characteristic dimension 80 is a diameter that is approximately 3 mm, with smaller and larger LEDs 45 contemplated by the invention. LEDs 45 of this type are commercially available from manufacturers such as Lumileds Lighting, LLC of San Jose, Calif. and marketed under the trade name LUXEON.

While the LED described is a particular shape, other shapes employing other materials will also produce the desired pattern of light.

Other side-emitting LEDs will also function with the present invention. For example, a standard LED could be constructed with a reflecting or refracting device that directs the light in the desired directions.

For use as a two-nautical mile navigation light on a boat, a 1-watt LED 45 is generally adequate. However, other applications contemplated by the present invention may require higher wattage LEDs 45. For example, an LED 45 on a buoy may need to be visible from several miles, thus requiring a 5-watt or larger LED.

When used in navigational applications, particular colors of light are required. While these colors can be achieved using color filters or lenses as shown in FIG. 5, these devices absorb some light and thus diminish the total light output. It is preferred to use an LED 45 that emits light of the wavelength corresponding to the desired color. For example, the right (starboard) side navigation light 15 must emit green light (approximately 505 nm wavelength), while the left (port) side navigation light 20 must emit red light (approximately 630 nm wavelength). Other applications may require an amber light or a white light. Many different color LEDs 45 are available and are suitable for use with the present invention (e.g., white, green, cyan, royal blue, blue, amber, orange, red-orange, etc.).

In another construction, two or more LEDs are combined to produce light of the desired color. For example, a red LED combined with a blue LED will produce magenta light. In fact, a red LED, a blue LED, and a green LED, can be used in combination to produce any desired color by varying the intensity of the individual LEDs.

In still other construction, two differently colored LEDs are disposed within a single housing. The two LEDs are sequenced on and off to produce the alternating colored flashing lights common on emergency and rescue vehicles.

The housing 35 is positioned a distance from the central axis A—A of the LED 45 and surrounds the light emitting surfaces 65 of the LED 45. The housing 35 includes a reflector portion 85 and a window portion 90. The reflector portion 85 is substantially cylindrical and has a diameter that is approximately 10 times the characteristic diameter 80 of the LED 45. The LED 45 is positioned within the housing 35 at a height such that the LED 45 is approximately centered vertically within the housing as shown in FIG. 2.

The window portion 90 defines an arc 95 through which the light will be visible. In the example illustrated in FIGS. 2 and 3 the window portion 90 extends across an arc 95 of about 112.5 degrees. Other lights may use larger or smaller window portions 90 that define larger or smaller arcs. For example, a stem navigation light, such as the one shown in FIG. 1, includes a window of 135 degrees. In still other constructions, the window portion 90 is supported for rotation about the LED axis A—A. These constructions are well suited to navigational beacons or emergency vehicle lights that emit a rotating beam of light. The window portion 90 can be manufactured from any transparent or translucent material (e.g., plastic, acrylic, glass, etc.). In some constructions, the edges of the window 90 are formed to further define the arc 95 through which the light is visible.

The reflector portion 85, when combined with the window portion 90, surrounds or encircles the light-emitting surfaces 65 of the LED 45. The reflector portion 85 includes a plurality of specular facets 100 such as the rectangular surfaces illustrated in FIG. 2. The facets 100 each have a width 105 and a height, with the width 105 being at least as wide as the characteristic dimension 80 of the LED 45. Facets 100 having a width 105 less than the characteristic dimension 80 will also function to reflect the emitted light. However, the intensity achieved is greatest when the width 105 of each facet 100 is approximately equal to or greater than the characteristic dimension 80.

In addition to the width 105, the position of each facet 100 affects the intensity of the light reflected through the window portion 90. While any facet position will reflect some light through the window portion 90, facets 100 positioned a specific distance 110 from the LED axis A—A will produce the highest intensity reflection. The specific distance 110 is approximately five times the characteristic dimension 80 of the LED 45, with larger or smaller distances producing a lower intensity reflection. For example, a reflector 85 for an LED 45 having a characteristic dimension 80 of 3 mm should be positioned 15 mm from the LED 45 to produce the highest intensity output. Thus, the diameter of the reflector portion 85 is ten times the characteristic dimension 80 of the LED 45.

Figure 6:
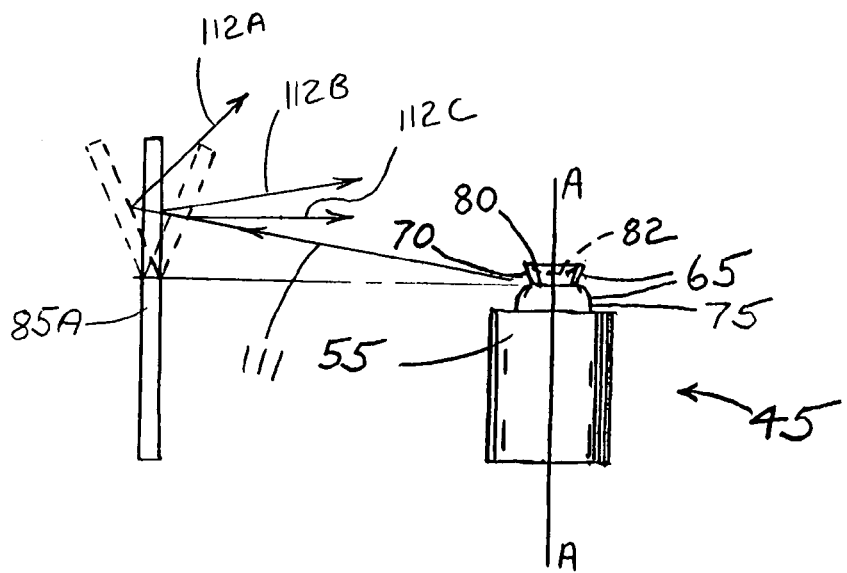
FIG. 6 is a front view of the optoelectronic device of FIG. 2 and including an angled reflector.

FIG. 6 illustrates another construction of the light 20 including an angled reflector portion 85A. The angled reflector portion 85A allows for precise control of the reflected light in the vertical direction. When used as a navigational aid, it is desirable to direct a majority of the light not only in a desired direction but also within a desired plane. If the LED 45 projects light out of the desired plane, the angled reflector 85A can redirect the light along the desired path. FIG. 6 illustrates a beam of light 111 exiting the LED 45 at an angle. The beam reflects along one of three paths 112A, 112B, or 112C depending on the position of the angled reflector 85A. As is evident from the drawing, the beam 112C reflected from the forward leaning angled reflector 85A travels along the desired plane and will produce the highest intensity light in the desired field of view of the light 20.

Figure 7:
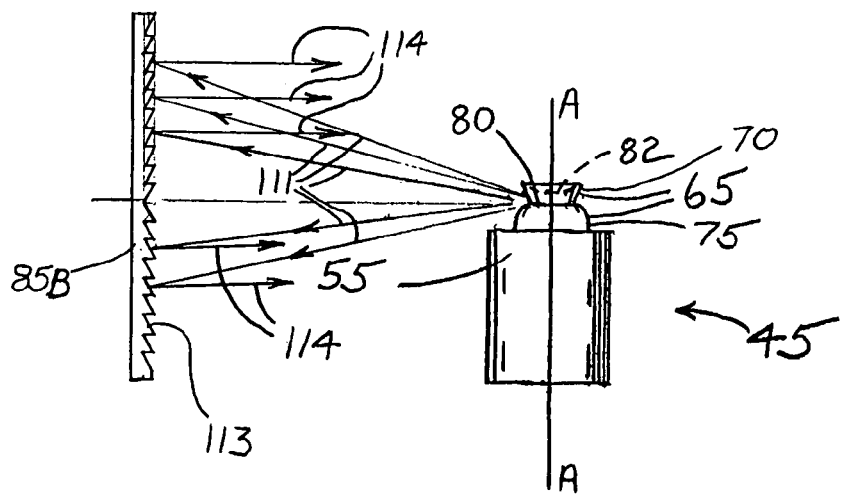
FIG. 7 is a front view of the optoelectronic device of FIG. 2 and including a saw-toothed reflector.

FIG. 7 illustrates yet another construction of the light 20 in which a saw-tooth reflector 85B is employed. The saw-tooth reflector 85B includes a plurality of stepped surfaces 113 positioned and angled to substantially collimate the light emitted by the LED 45. The stepped surfaces 113 are angled relative to the central axis A—A such that they reflect light along lines that are substantially perpendicular to the central axis A—A. To that end, the angles between the stepped surfaces 113 vary. Light beams 111 emitted by the LED 45 at various angles reflect off the stepped surfaces as substantially parallel beams 114.

In another construction, a saw-tooth reflector similar to that of FIG. 7 is employed. However, rather than varying the angles of the stepped-surfaces, the entire reflector is curved slightly. This construction also produces substantially collimated light.

As can be seen, there are many ways to reflect the light along the desired path and only a few examples have been illustrated. Other shaped reflectors are known and could be used with the present invention to achieve reflected light in the desired plane. For example, a smooth collimating reflector could be employed rather than the stepped construction illustrated in FIG. 7. Therefore, the reflector 85 should not be limited to the examples illustrated herein.

The reflector portion 85 is manufactured from a base or substrate 115 material that is coated with a highly reflective specular material 120. The substrate 115 can be any suitable material (e.g., plastic, metal, ceramic, composite, glass, etc.) so long as the material can be formed into the plurality of facets 100 and will accept the coating of the specular reflective material 120. In other constructions, a plurality of rectangular reflectors are assembled into a support structure to complete the reflector portion 85 of the housing 35.

In one construction, the substrate 115 is coated with highly reflective aluminum to produce the highly reflective surface. Other constructions use other reflective materials (e.g., silver, nickel, beryllium, etc.). Still other constructions use a highly polished surface rather than a coating to achieve the highly specular reflective surface.

In another construction, illustrated in FIG. 5 a single white LED 45A is disposed within a housing 35A. The window portion 90A is subdivided into two different color lenses, one red 120 and one green 125. Thus, a single LED provides light for both the right (starboard) and left (port) navigation light.

In operation, a DC electrical system provides the necessary power to operate the LED 45. DC electrical systems from 6 volts to 48 volts are common and can be used to power the LED 45 of the present invention, with lower and higher voltage systems also being capable of operating the present invention. The voltage and current output from the electrical system are maintained within a desired range by the electronic regulator circuit 55 (shown in FIG. 5). For example, a one-watt red LED may operate ideally at 2.95 volts with a range of voltage between 2.5 V and 3.5 V being acceptable. Like the voltage, the LED is capable of operating within a wide range of current. Electronic regulator circuits capable of maintaining the voltage and current supply within a desired range are common and well known in the art.

Figure 3:
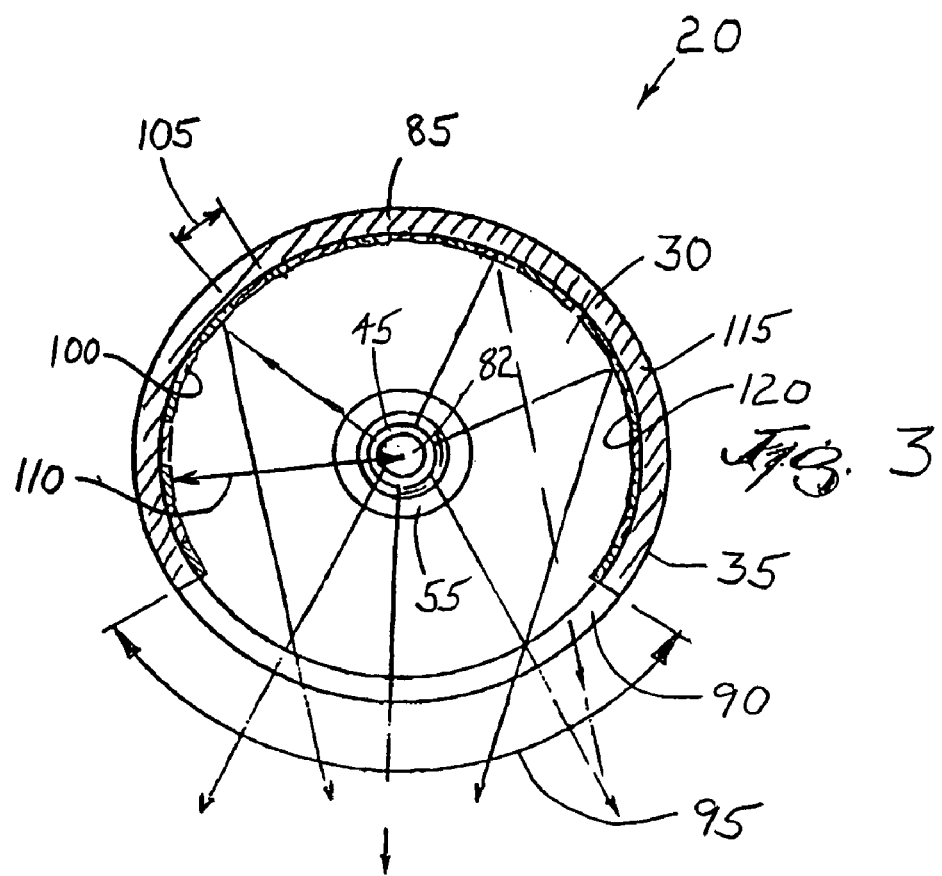
FIG. 3 is a top view of the navigation light of FIG. 2.

Once power is applied to the LED 45, light is emitted as shown in FIG. 3. The light reflects off the reflector portion 85 and passes through the window portion 90. Thus, a substantial portion of the light emitted by the LED 45 passes through the window portion 90 to produce light that is visible from anywhere within the desired arc 95.

While the invention has been described as including an LED that emits light of a certain wavelength, a person having ordinary skill in the art will realize that LEDs emit a narrow distribution of light, typically in the visible, ultraviolet, or infrared portion of the spectrum.

It should be noted that although the invention has been described as including an LED 45 that emits light centered in the visible portion of the electromagnetic spectrum, LEDs that emit significant light centered outside of the visible spectrum could also be used with the present invention. For example, a remote control device (e.g., a television remote control) often uses an infrared LED to send a signal to the device being controlled. The present invention could be used to increase the intensity of the emitted infrared signal, thus improving the range of the remote control.

In still other constructions, a photodetector rather than an LED is positioned within the housing 35. The photodetector is able to detect low intensity light from any angle within the open window portion 90.

In another application, the present invention is used in an infrared motion sensor. The invention increases the intensity of the collected infrared light and improves the sensitivity of the motion sensor. Infrared light reflects off the facets within the reflector to a detector. As an object moves within the field of view of the motion sensor, the collected light reflects off of the facets differently or reflects off new facets entirely, thereby creating modulation in the detected signal making it easier for the motion sensor to detect motion.

While the invention has been described as using a single LED 45, some applications may use two or more LEDs. For example, the cover 40 of FIG. 2 could be replaced with an inverted base 30 that includes a second LED. This arrangement would position two LEDs within the same housing 35, thereby improving the intensity of the device. In addition, as previously described the two, or more, LEDs could be differently colored to produce a color not commercially available in a single LED. Furthermore, the two, or more, LEDs could be sequenced to produce flashing multi-color lights such as those used on emergency vehicles and the like.

Although the invention has been described in detail with reference to certain preferred embodiments, variations and modifications exist within the scope and spirit of the invention as described and defined in the following claims.

What is claimed is:

1. A high-intensity light comprising:
   a side-emitting optoelectronic device adapted to emit light of a desired color;
   a heat sink adjacent the optoelectronic device;
   a reflector at least partially surrounding the optoelectronic device, the reflector spaced a distance from the optoelectronic device; and
   a window portion sized to output the light in a desired arc.

2. The high-intensity light of claim 1, wherein the optoelectronic device includes a side-emitting light-emitting diode.

3. The high-intensity light of claim 1, wherein the desired color is one of red, green, and white.

4. The high-intensity light of claim 1, wherein the heat sink is made from aluminum.

5. The high-intensity light of claim 1, wherein the optoelectronic device defines a characteristic dimension.

6. The high-intensity light of claim 5, wherein the characteristic dimension is approximately 3 millimeters.

7. The high-intensity light of claim 5, wherein the reflector further comprises a plurality of facets.

8. The high-intensity light of claim 7, wherein each facet defines a width, and wherein the width of each facet is approximately equal to the characteristic dimension.

9. The high-intensity light of claim 5, wherein the distance between the reflector and the optoelectronic device is approximately equal to five times the characteristic dimension.

10. The high-intensity light of claim 1, wherein the desired arc is at least 90 degrees.

11. The high-intensity light of claim 1, wherein the side-emitting optoelectronic device further comprises a truncated substantially spherical portion and a frustoconical portion having a concave top, the frustoconical portion disposed adjacent the truncated substantially spherical portion.

12. The high-intensity light of claim 1, wherein the light is a navigation light.

13. The high-intensity light of claim 1, wherein the reflector includes a movable portion.

14. The high-intensity light of claim 13, wherein the movable portion tilts relative to a central axis defined by the side-emitting optoelectronic device.

15. The high-intensity light of claim 1, wherein the reflector includes a reflective surface having a saw-tooth pattern.

16. The high-intensity light of claim 15, wherein the saw-tooth pattern includes a plurality of teeth, each tooth defining a reflective surface that is angled relative to a central axis defined by the side-emitting optoelectronic device to reflect light emitted by the side-emitting optoelectronic device along paths that are substantially perpendicular to the central axis.

17. The high-intensity light of claim 1, further comprising a second reflector positioned to reflect emitted light along paths that are substantially perpendicular to a central axis defined by the side-emitting optoelectronic device.

18. The high-intensity light of claim 17, wherein the second reflector is a conical reflector positioned above a top surface of the side-emitting optoelectronic device.

19. The high-intensity light of claim 17, wherein the second reflector includes a reflective coating applied to the top surface of the side-emitting optoelectronic device.

20. A light-emitting apparatus powered by a direct current, the apparatus comprising:
    a substantially water-tight housing including a base, a reflector portion having a plurality of facets, and a window portion defining an arc;
    a side-emitting optoelectronic device supported within the housing and spaced a distance from the reflector portion, the optoelectronic device emitting light of a desired color when powered by the direct current, at least some of the facets redirecting a portion of the emitted light toward the window portion.

21. The light-emitting apparatus of claim 20, wherein the base is made from a material containing aluminum.

22. The light-emitting apparatus of claim 20, wherein the desired color is one of red, green, and white.

23. The light-emitting apparatus of claim 20, wherein the optoelectronic device has a characteristic dimension, and the dimension is approximately 3 millimeters.

24. The light-emitting apparatus of claim 23, wherein characteristic dimension is approximately 3 millimeters.

25. The light-emitting apparatus of claim 23, wherein each of the plurality of facets is substantially rectangular and each facet defines a width.

26. The light-emitting apparatus of claim 25, wherein the width of each facet is approximately equal to the characteristic dimension.

27. The light-emitting apparatus of claim 23, wherein the distance between the reflector and the optoelectronic device is approximately equal to five times the characteristic dimension of the optoelectronic device.

28. The light-emitting apparatus of claim 20, wherein the desired arc is at least 90 degrees.

29. The light-emitting apparatus of claim 20, wherein the optoelectronic device further comprises a truncated substantially spherical portion and a frustoconical portion having a concave top, the frustoconical portion disposed adjacent the truncated substantially spherical portion.

30. The light-emitting apparatus of claim 20, wherein the optoelectronic device includes a side-emitting light-emitting diode.

31. The light-emitting apparatus of claim 20, wherein the light is a navigation light.

32. The light-emitting apparatus of claim 20, wherein the reflector includes a movable portion.

33. The light-emitting apparatus of claim 32, wherein the movable portion tilts relative to a central axis defined by the side-emitting optoelectronic device.

34. The light-emitting apparatus of claim 20, wherein the reflector includes a reflective surface having a saw-tooth pattern.

35. The light-emitting apparatus of claim 34, wherein the saw-tooth pattern includes a plurality of teeth, each tooth defining a reflective surface that is angled relative to a central axis defined by the side-emitting optoelectronic device to reflect light emitted by the side-emitting optoelectronic device along paths that are substantially perpendicular to the central axis.

36. The light-emitting apparatus of claim 20, further comprising a second reflector positioned to reflect emitted light along paths that are substantially perpendicular to a central axis defined by the side-emitting optoelectronic device.

37. The light-emitting apparatus of claim 36, wherein the second reflector is a conical reflector positioned above a top surface of the side-emitting optoelectronic device.

38. The light-emitting apparatus of claim 36, wherein the second reflector includes a reflective coating applied to the top surface of the side-emitting optoelectronic device.

39. A light-emitting apparatus adapted to project high-intensity light in a desired arc, the apparatus comprising:
   a side-emitting light source having a top, a bottom, and sides connecting the top and bottom, the light source operable to emit light of a desired color through the sides;
   a base supporting the light source;
   a window portion partially surrounding the light source, the window portion extending through a window arc equal to the desired arc;
   a multi-faceted reflector positioned to reflect light toward the window portion, the reflector and the window together completely encircling the sides of the light source, the facets of the multi-faceted reflector positioned to reflect the light through the window portion to produce a wedge-shaped directional beam of light; and
   a second reflector positioned to reflect emitted light along paths that are substantially perpendicular to a central axis defined by the side-emitting light source.

40. The apparatus of claim 39, wherein the side-emitting light source includes a side-emitting light emitting diode.

41. The apparatus of claim 40, wherein the side emitting light emitting diode further comprises a truncated substantially spherical portion and a frustoconical portion having a concave top, the frustoconical portion disposed adjacent the truncated substantially spherical portion, the intersection of the frustoconical portion and the truncated substantially spherical portion defining a characteristic dimension.

42. The light-emitting apparatus of claim 39, wherein the light is a navigation light.

43. The light-emitting apparatus of claim 39, wherein the multi-faceted reflector includes a movable portion.

44. The light-emitting apparatus of claim 43, wherein the movable portion tilts relative to a central axis defined by the side-emitting light source.

45. The light-emitting apparatus of claim 39, wherein the multi-faceted reflector includes a reflective surface having a saw-tooth pattern.

46. The light-emitting apparatus of claim 45, wherein the saw-tooth pattern includes a plurality of teeth, each tooth defining a reflective surface that is angled relative to a central axis defined by the side-emitting light source to reflect light emitted by the side-emitting light source along paths that are substantially perpendicular to the central axis.

47. The light-emitting apparatus of claim 39, wherein the second reflector is a conical reflector positioned above the top surface of the side-emitting light source.

48. The light-emitting apparatus of claim 39, further comprising a reflective coating applied to the top surface of the side-emitting light source.

* * * * *